US012006136B1

(12) United States Patent
Szeglin et al.

(10) Patent No.: US 12,006,136 B1
(45) Date of Patent: Jun. 11, 2024

(54) IBC INSTALLATION/MANIPULATION TOOL FOR STACKED RAIL CONTAINERS

(71) Applicant: Peck & Hale, L.L.C., West Sayville, NY (US)

(72) Inventors: John L. Szeglin, Sayville, NY (US); Richard Belkin, Mooresville, NC (US)

(73) Assignee: Peck & Hale, L.L.C., West Sayville, NY (US)

( * ) Notice: Subject to any disclaimer, the term of this patent is extended or adjusted under 35 U.S.C. 154(b) by 503 days.

(21) Appl. No.: 17/066,382

(22) Filed: Oct. 8, 2020

Related U.S. Application Data

(60) Provisional application No. 62/912,704, filed on Oct. 9, 2019.

(51) Int. Cl.
*B65D 90/00* (2006.01)
*B25B 27/14* (2006.01)
*B66C 1/10* (2006.01)
*B66C 23/16* (2006.01)
*B66C 23/48* (2006.01)

(52) U.S. Cl.
CPC .............. *B65D 90/002* (2013.01); *B66C 1/10* (2013.01); *B66C 23/166* (2013.01); *B25B 27/14* (2013.01); *B66C 23/48* (2013.01); *B66C 2700/0357* (2013.01)

(58) Field of Classification Search
CPC ........... B65D 90/002; B65D 2590/0008–0033; B66C 1/10; B66C 23/166; B66C 23/48; B66C 27/14; B66C 2700/0357; Y10T 29/53796; Y10T 29/53896; Y10T 29/53909; Y10T 29/53961; Y10T 29/53974; Y10T 29/53991; Y10T 29/54; B60P 7/0853
USPC ..................... 29/267; 254/3 R, 8 R, 131–132
See application file for complete search history.

(56) References Cited

U.S. PATENT DOCUMENTS

| | | | | | |
|---|---|---|---|---|---|
| 546,088 | A * | 9/1895 | Clancy | B60P 1/4428 | 414/688 |
| 679,989 | A * | 8/1901 | O'Carroll | A01D 90/10 | 414/25 |
| 866,638 | A * | 9/1907 | Ewers | E02F 3/4135 | 37/285 |
| 2,041,926 | A * | 5/1936 | Herwander | A01D 87/12 | 414/739 |
| 2,445,076 | A * | 7/1948 | Munson | A01D 87/003 | 414/733 |
| 3,013,684 | A * | 12/1961 | King | B66F 9/19 | 414/607 |
| 3,917,200 | A * | 11/1975 | Johnson | B66C 23/005 | 248/654 |
| 4,075,913 | A * | 2/1978 | Tye | H01R 11/14 | 52/125.4 |
| 4,902,191 | A * | 2/1990 | Cumbest | B66C 23/48 | 254/10 R |

(Continued)

*Primary Examiner* — David S Posigian
*Assistant Examiner* — Jacob Adam Montgomery
(74) *Attorney, Agent, or Firm* — Schroeder Law PC

(57) ABSTRACT

A tool for installing and removing an interbox connector into and from a corner fitting of a cargo container positioned on a rail car. The tool includes support structure configured to releasably engage the opening in the upper locking cone of the connector whereby the connector can be delivered to or removed from the corner fitting without the need for the operator to climb onto the rail car.

11 Claims, 8 Drawing Sheets

(56) References Cited

U.S. PATENT DOCUMENTS

| | | | | | |
|---|---|---|---|---|---|
| 5,203,837 | A * | 4/1993 | Madic | B66C 23/163 | 212/175 |
| 5,390,970 | A * | 2/1995 | Gray | B25J 1/04 | 294/210 |
| 5,897,100 | A * | 4/1999 | Napier | B66C 23/485 | 254/133 R |
| 9,156,664 | B1 * | 10/2015 | Lopez | A63H 37/00 | |
| 2004/0022616 | A1 * | 2/2004 | Bouthillier | B65G 67/30 | 414/642 |
| 2006/0043041 | A1 * | 3/2006 | Lopes | B66C 23/48 | 212/175 |
| 2006/0169661 | A1 * | 8/2006 | Brossart | B66C 23/46 | 212/241 |
| 2009/0304487 | A1 * | 12/2009 | Gonzalo | B66F 9/061 | 414/738 |
| 2011/0303770 | A1 * | 12/2011 | Shelton | F16L 3/02 | 239/726 |
| 2015/0262516 | A1 * | 9/2015 | White | A47F 13/06 | 40/606.03 |

* cited by examiner

IBC INSTALLATION/MANIPULATION TOOL FOR STACKED RAIL CONTAINERS

BACKGROUND OF THE INVENTION

The present invention relates to a tool for installing/removing interbox connectors (IBCs) used to secure double stacked cargo containers in the rail industry and, more particularly to a movable, ground-based tool for installing/removing/locking/unlocking IBCs without the need for an operator to climb onto the rail car, as well as a method for accomplishing same.

Historically, many double stack container rail operations required five climbs on and off the rail car to secure and unsecure a container during transport. These five climbs included i) installing the IBC, ii) locking the IBC, iii) verification of locked IBC, iv) unlocking the IBC, and v) removing the IBC.

The track-side-operated IBC eliminates three of these climbs, namely, locking the IBC, verification of locked IBC, and unlocking the IBC. However, without any other tools or aids, two climbs are still required to place and remove the IBC.

There is therefore a need in the art for a tool which can be used by an operator to install/remove the IBC from the cargo container without the need for the operator to climb onto the rail car. There is a further need in the art for a method of installing/removing the IBC from the cargo container without the need for the operator to climb onto the rail car.

SUMMARY OF THE INVENTION

The present invention, which addressed the needs of the prior art, relates to a tool for installing and removing an IBC into and from a corner fitting of a cargo container positioned on a rail car, the IBC including upper and lower locking cones, the upper locking cone including an opening therethrough, the IBC further including a handle for twisting the cones. The tool includes a base. The tool further includes a support column carried on the base. The tool further includes a boom pivotably supported by the support column, the boom having a delivery end and an opposing operator end. The tool further includes support structure attached to the delivery end of the boom, the support structure configured to releasably engage the opening in the upper locking cone whereby the IBC can be delivered to or removed from the corner fitting of the cargo container, the support structure including an orienting mechanism for facilitating the orientation of the IBC with respect to the corner fitting. The tool further includes a release mechanism extending between the support structure and the operating end for releasing the IBC from the support structure during installation. Finally, the boom is pivotable between a first position wherein the delivery end is located at a height which allows an operator to load the IBC onto the support structure and a second position wherein the delivery end is located at a height which allows the operator to install or remove the IBC to or from the corner fitting.

The present invention further relates to a tool for installing and removing an IBC into and from a corner fitting of a cargo container positioned on a rail car, the IBC including upper and lower locking cones, the upper locking cone including an opening therethrough, the IBC further including a handle for twisting the cones. The tool includes a base. The tool further includes a telescoping support column having first and second ends, the first end being connected to the base. The tool further includes support structure attached to the second end of the column, the support structure being configured to releasably engage the opening in the upper locking cone whereby the IBC can be delivered to or removed from the corner fitting of the cargo container, the support structure including an orienting mechanism for facilitating the orientation of the IBC with respect to the corner fitting. The tool further includes a release mechanism extending from the support structure for releasing the IBC from the support structure during installation. Finally, the column is extendable between a first position wherein the support structure is located at a height which allows an operator to load the IBC onto the support structure and a second position wherein the support structure is located at a height which allows the operator to install or remove the IBC to or from the corner fitting.

As a result, the present invention provides a tool which can be used by an operator to install/remove an IBC from the cargo container without the need for the operator to climb onto the rail car. The present invention further provides a method of installing/removing the IBCs used to secure double stacked cargo containers in the rail industry without the need for the operator to climb onto the rail car.

DETAILED DESCRIPTION OF THE INVENTION

Figure 1:
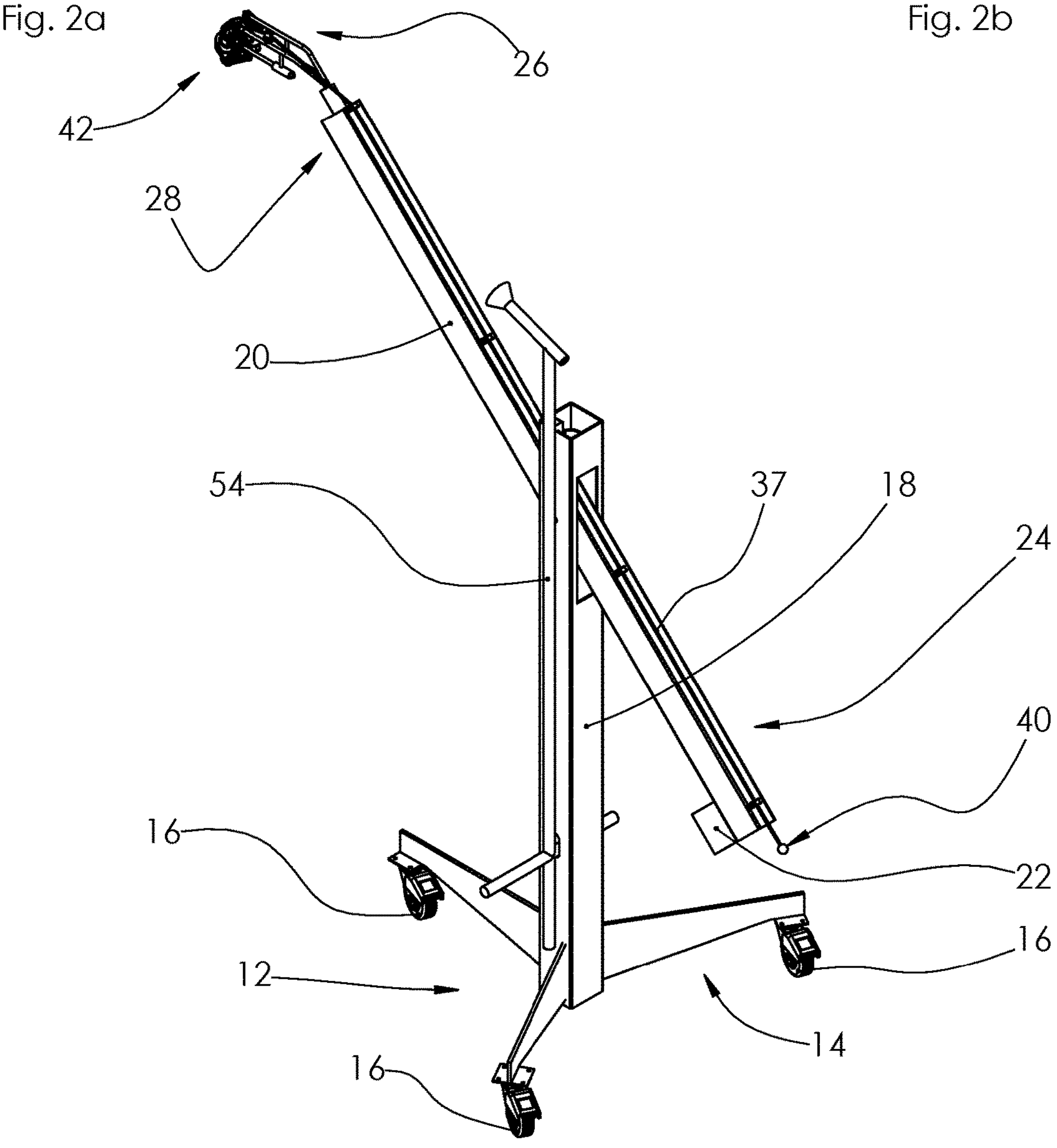
FIG. 1 is a perspective view of a first embodiment of the IBC installation/manipulation tool of the present invention.

A tool 10 is shown in FIG. 1. Tool 10 is preferably a ground-based movable unit. Tool 10 includes a base 12, e.g., support tripod 14 and wheels 16. Tool 10 further includes a support column 18 for pivotably supporting a boom 20. In one preferred embodiment, a counterweight 22 is attached to operator end 24 of boom 20. Support structure 26 for installing/removing the IBC (also referred to as a "twistlock") is attached to delivery end 28 of boom 20.

Support structure 26 preferably includes a support truss 30 having an upper horizontal bar 32 and a lower horizontal bar 34. A spring-loaded latch (or keeper) 36 is secured to an end of upper horizontal bar 32. Keeper 36 is actuated via a pull rope 37 which extends to operator end 24, and preferably passes through a plurality of pulleys 38. Pull rope 37 preferably terminates with a gripping mechanism, e.g., ball grip 40, for allowing the operator to readily grasp and manipulate the pull rope to actuate keeper 36.

Figure 2A:
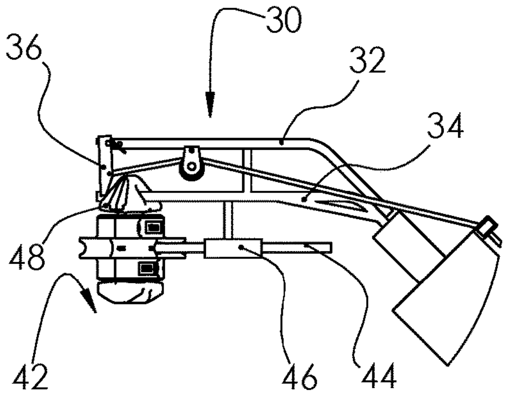
FIG. 2*a* is an enlarged elevational view of the twistlock support structure of FIG. 1 with the keeper shown in the closed position.
Figure 2B:
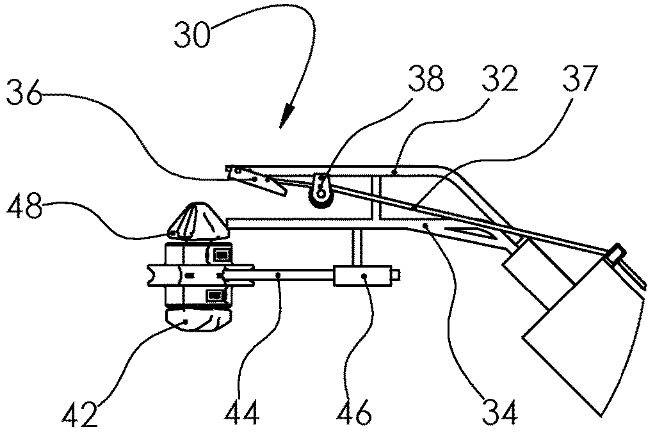
FIG. 2*b* is an enlarged elevational view of the twistlock support structure of FIG. 1 with the latch shown in the open position.

The IBC, e.g., twistlock 42, is first loaded onto support structure 26 by the operator. As shown in FIGS. 2*a* to 2*b*, the operator slides the end of horizontal bar 34 through the opening in the upper locking cone of the unlocked twistlock 42. Twistlock 42 includes a handle 44, which engages a guide 46 to help orient the twistlock with respect to the tool. Spring-loaded keeper 36 rotates toward the tool to allow upper locking cone 48 of twistlock 42 to continue sliding onto lower horizontal bar 34. Once keeper 36 is clear of upper locking cone 48, it springs back to its locked, vertical position (as shown in FIG. 2*a*).

Figure 3A:
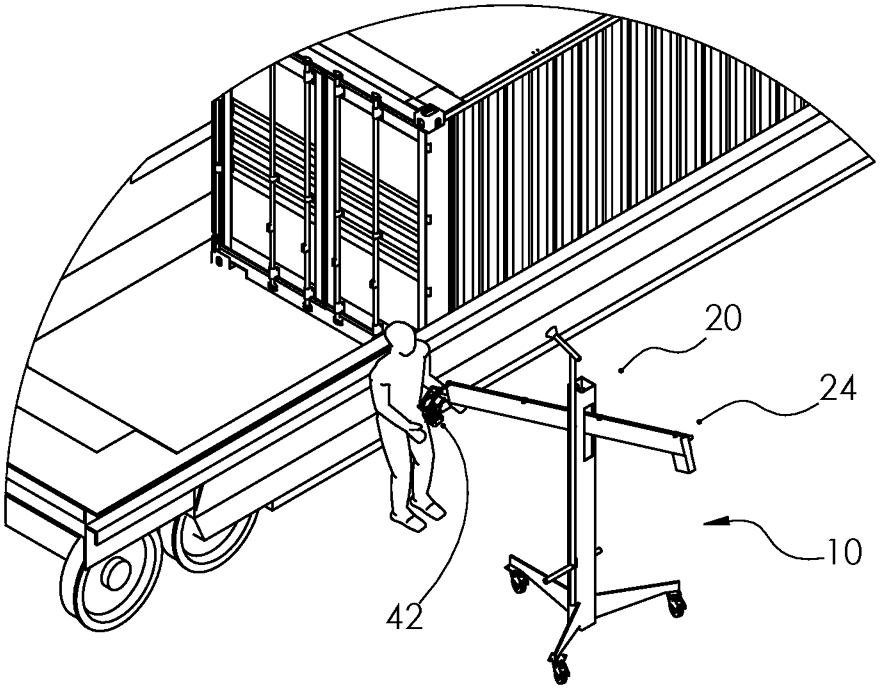
FIG. 3*a* is a perspective view of the tool of FIG. 1 located alongside a railcar.
Figure 3B:
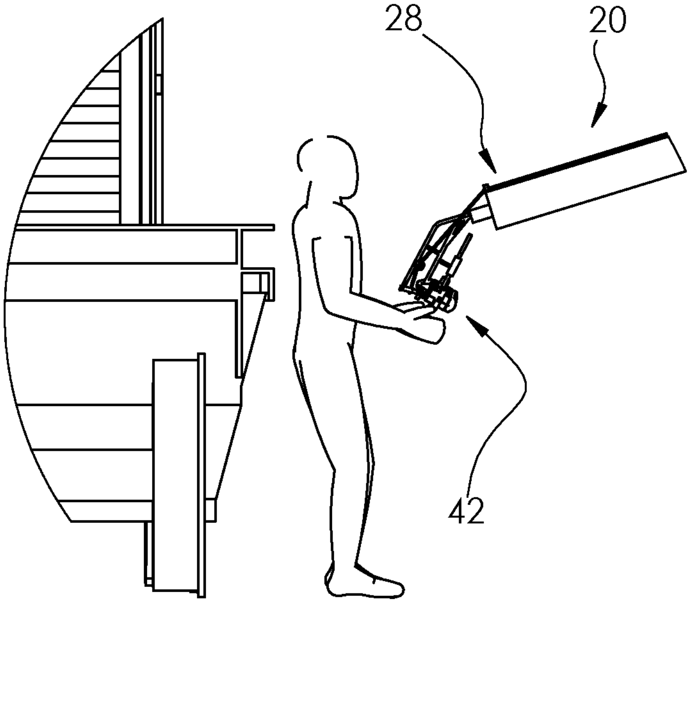
FIG. 3*b* is an enlarged elevational view showing an operator loading a twistlock onto the twistlock support structure.
Figure 3C:
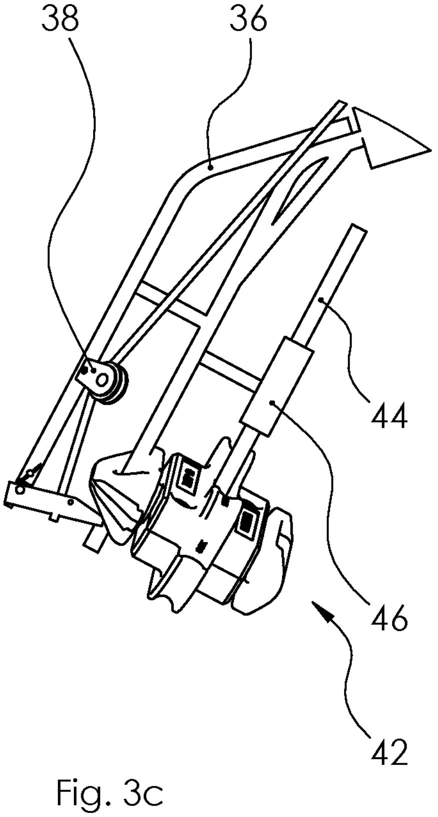
FIG. 3*c* is an enlarged view showing the twistlock loaded onto the twistlock support structure.

As shown in FIGS. 3*a* to 3*c*, delivery end 28 of boom 20 can be pivoted towards the ground to allow the operator to load twistlock 42 onto support structure 26. In one embodiment, a rope handle (not shown) which attaches to delivery end 28 may be used to pivot the delivery end towards the ground. As best seen in FIG. 3*c*, twistlock 42 is supported by lower horizontal bar 34, oriented by the interaction between handle 44 and guide 46, and retained by keeper 36.

Figure 4A:
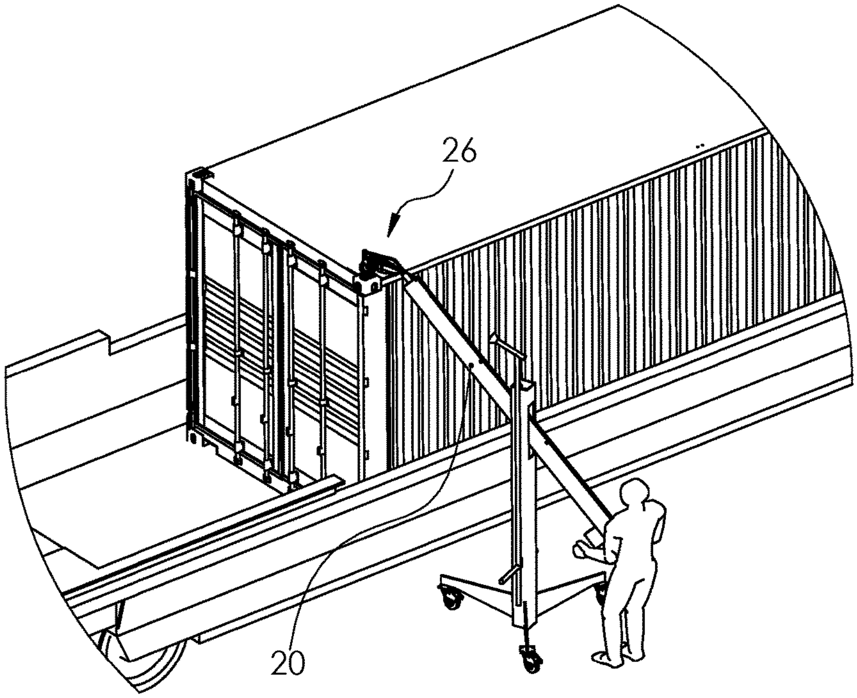
FIG. 4*a* is a perspective view showing the operator positioning the twistlock over an ISO fitting of a container.
Figure 4B:
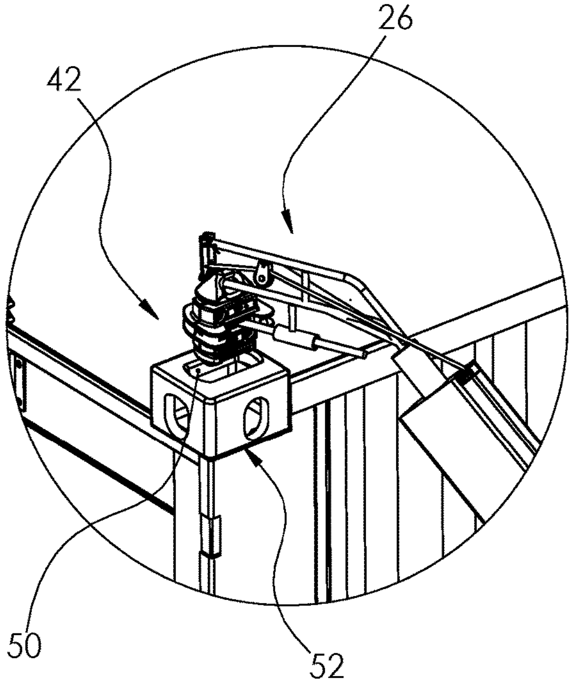
FIG. 4*b* is an enlarged perspective view showing the twistlock positioned over the ISO fitting of the container.
Figure 4C:
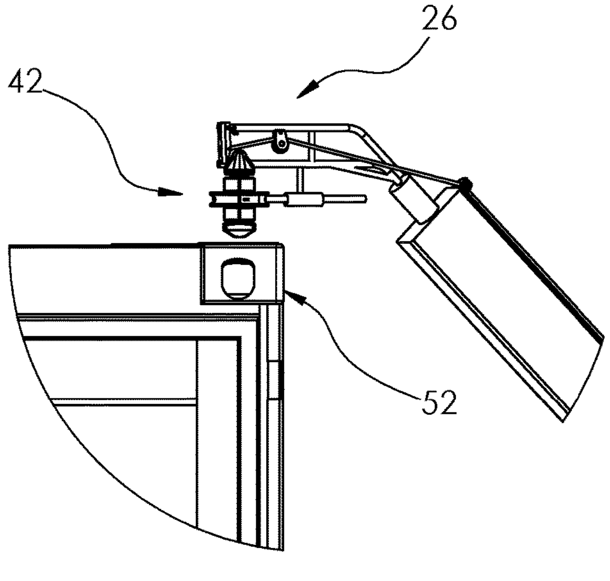
FIG. 4*c* a side elevation view showing the twistlock positioned over the ISO fitting of the container.
Figure 5A:
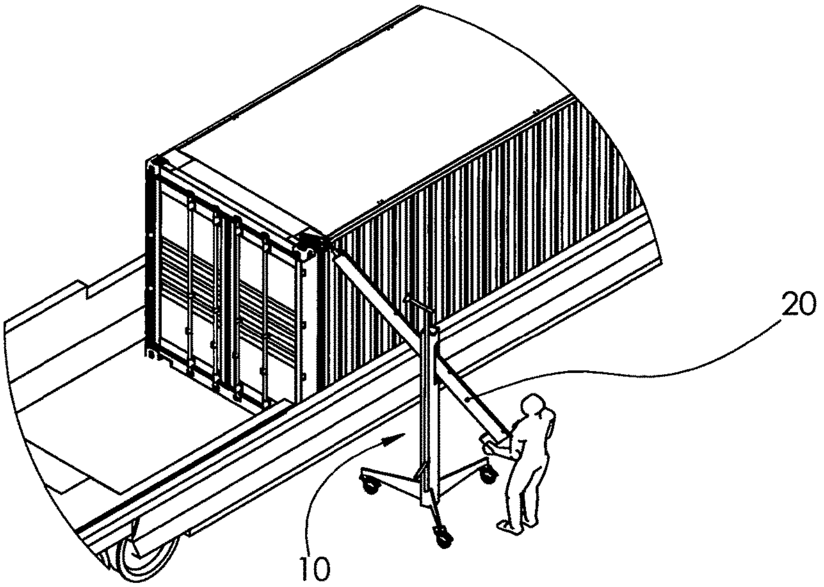
FIG. 5*a* is a perspective view showing the operator installing the twistlock into the ISO fitting of the container.
Figure 5B:
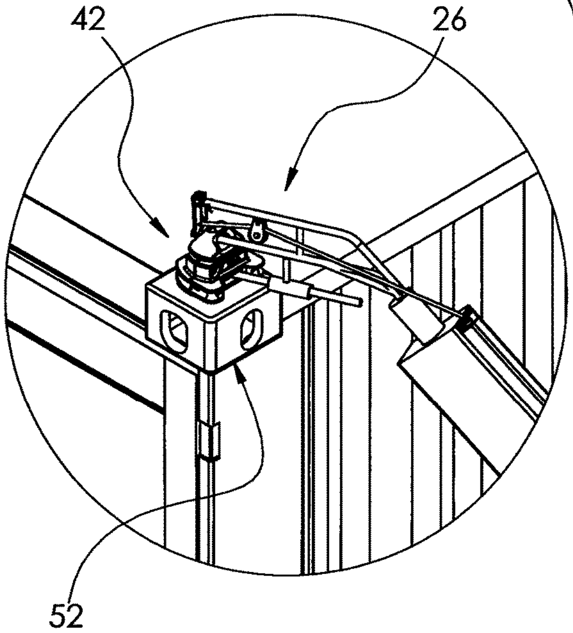
FIG. 5*b* is an enlarged perspective view showing the twistlock installed in the ISO fitting of the container.
Figure 5C:
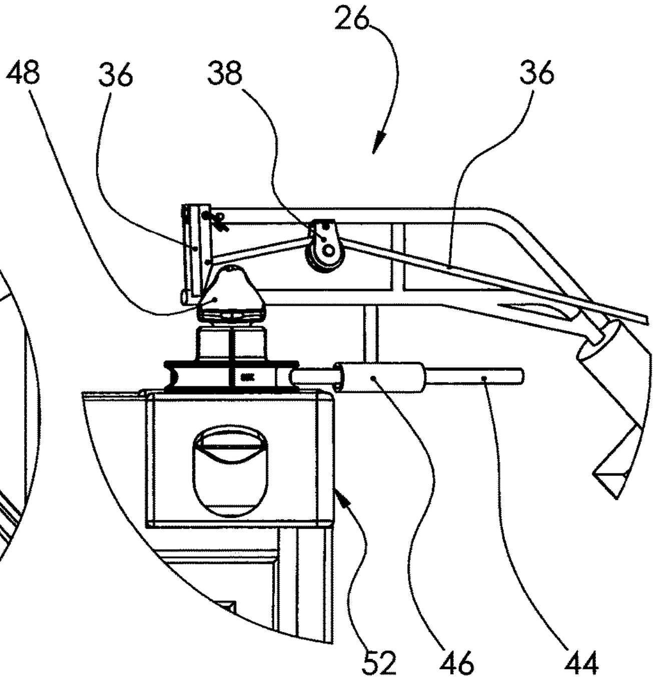
FIG. 5*c* a side elevation view showing the twistlock installed in the ISO fitting of the container.
Figure 6A:
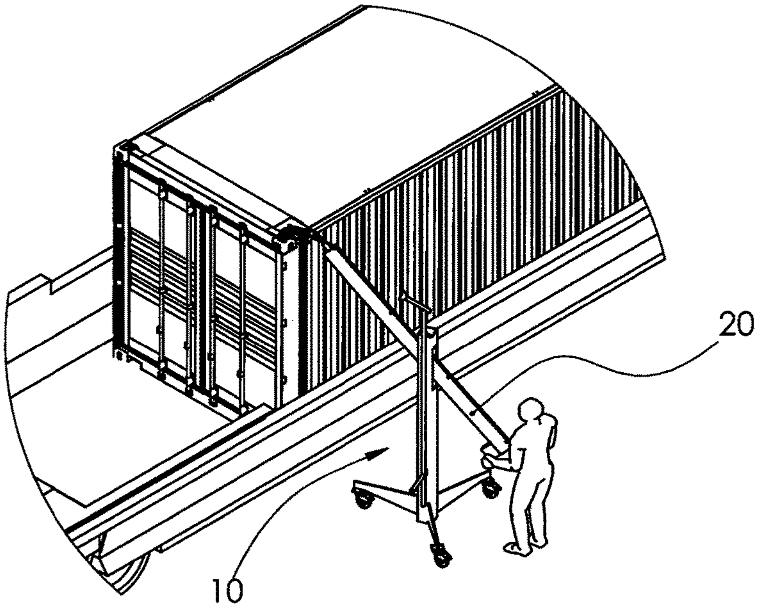
FIG. 6*a* is a perspective view showing the operator disengaging the tool from the installed twistlock.
Figure 6B:
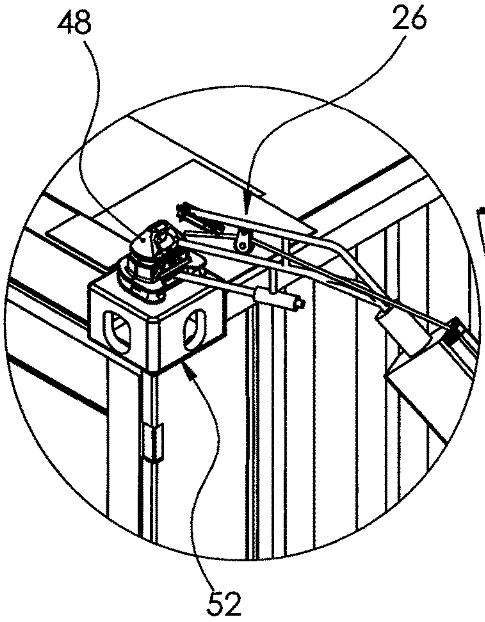
FIG. 6*b* is an enlarged perspective view showing the tool disengaged from the twistlock.
Figure 6C:
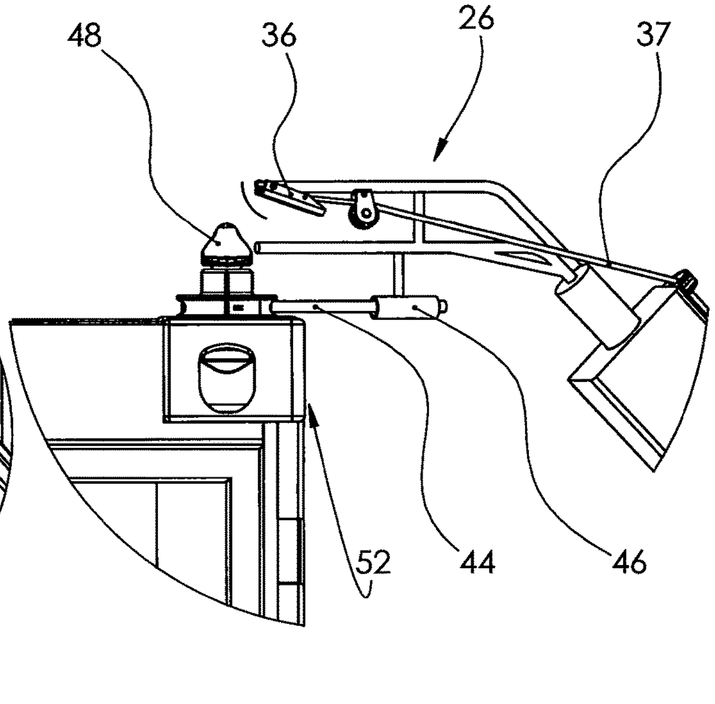
FIG. 6*c* a side elevation view showing the tool disengaged from the twistlock.

Referring now to FIGS. 4*a* to 4*c*, tool 10 is wheeled towards the container where the twistlock is to be placed, using the side of the corner fitting as a guide. The operator pivots boom 20 such that delivery end 28 positions support structure 26 (and twistlock 42) over aperture 50 of corner fitting 52. As shown in FIGS. 5*a* to 5*c*, the operator then manipulates boom 20 such that delivery end 28 is lowered, thereby positioning the lower cone of twistlock 42 into aperture 50 of corner fitting 52. Referring now to FIGS. 6*a* to 6*c*, the operator now actuates pull rope 37, which in turn moves keeper 36 to the open position—allowing tool 10 to be rolled away from the rail car.

As tool 10 is rolled away from the rail car, lower horizontal bar 38 is withdrawn from the hole in top cone 48 (see FIG. 6*c*). At the same time, guide 46 slides along handle 44. The tool is continued to be rolled away from the rail car until the guide is fully disengaged from handle 44. The same procedure is repeated in each of the other three corners of the lower cargo container.

Figure 7A:
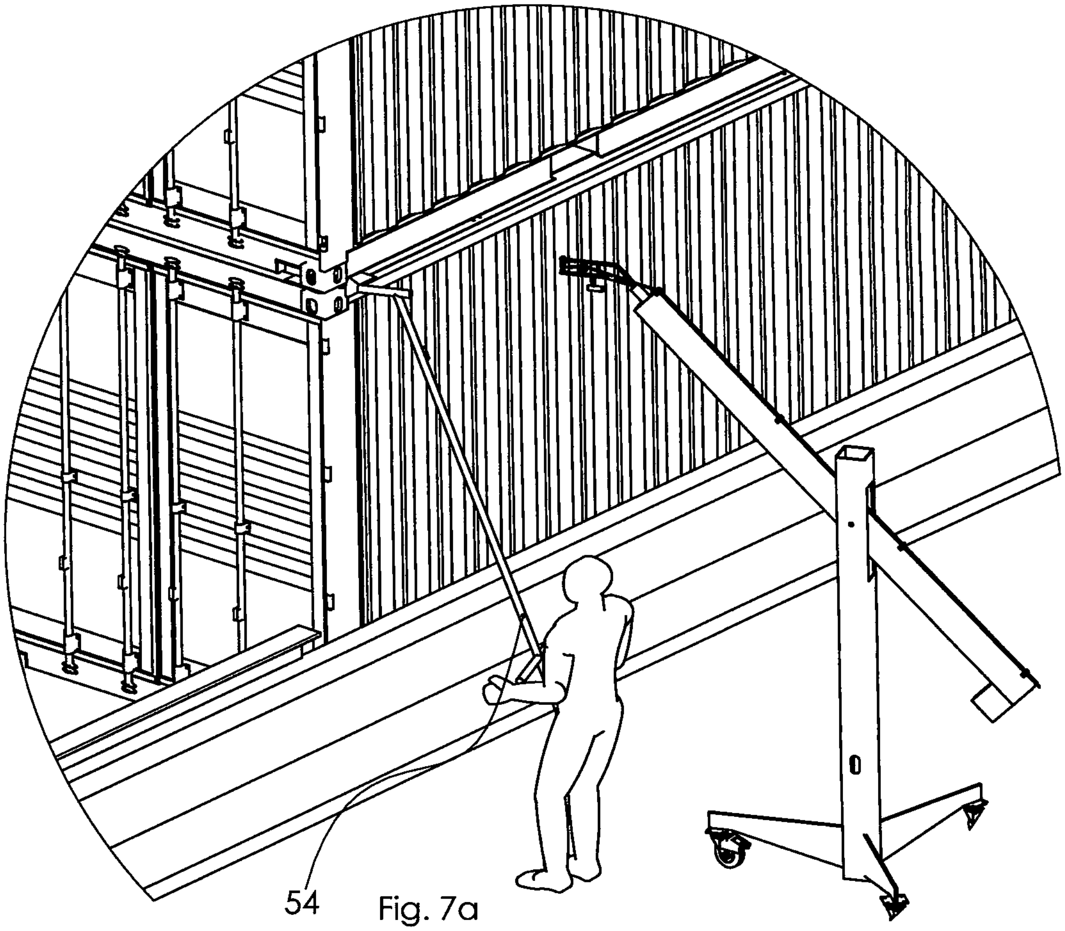
FIG. 7*a* is a perspective showing the operator locking the twistlock using a locking pole.
Figure 7B:
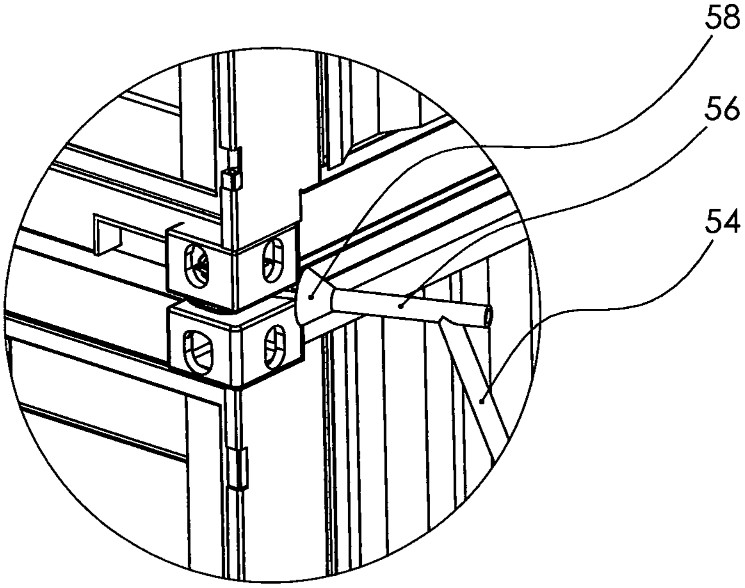
FIG. 7*b* is an enlarged detail showing the operating end of the locking pole of FIG. 7*a* engaged with the handle of the twistlock.
Figure 8A:
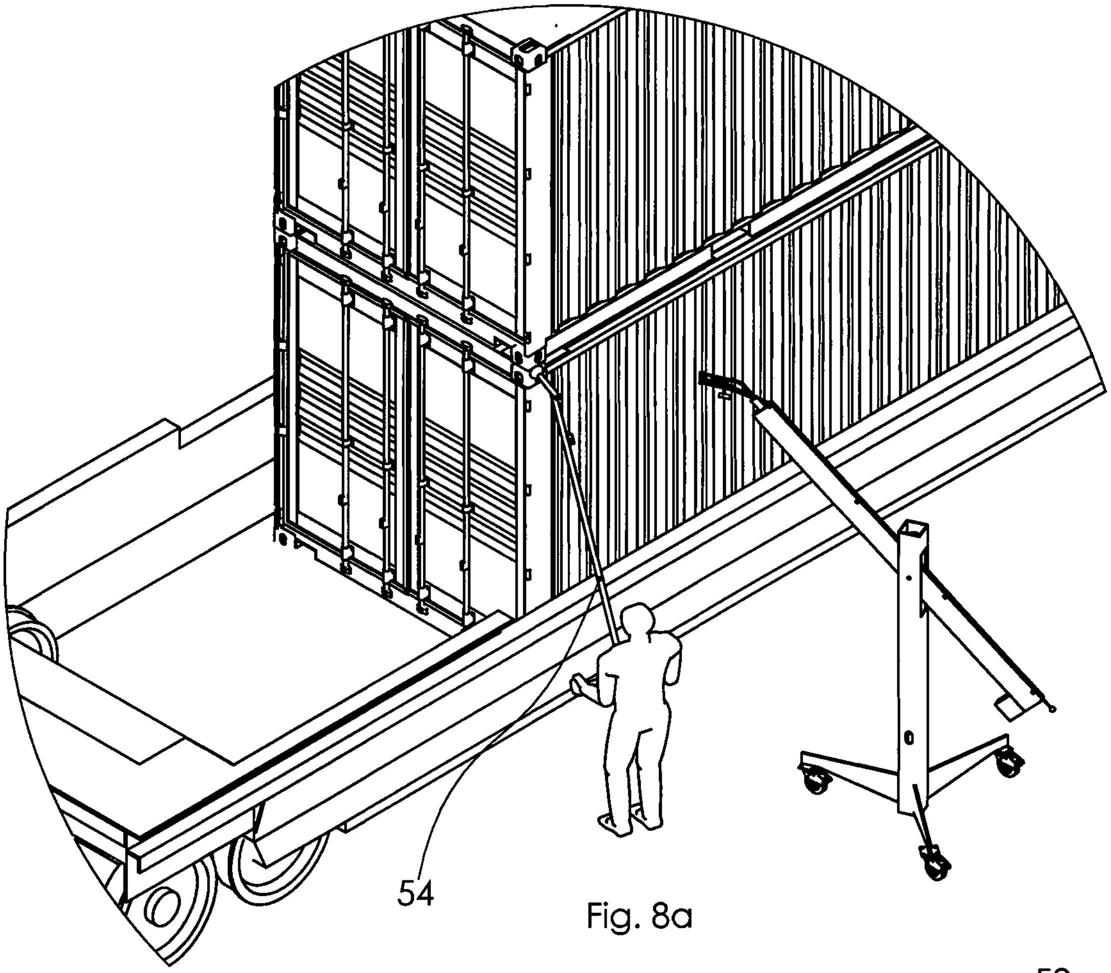
FIG. 8*a* is a perspective showing the operator unlocking the twistlock using the locking pole.
Figure 8B:
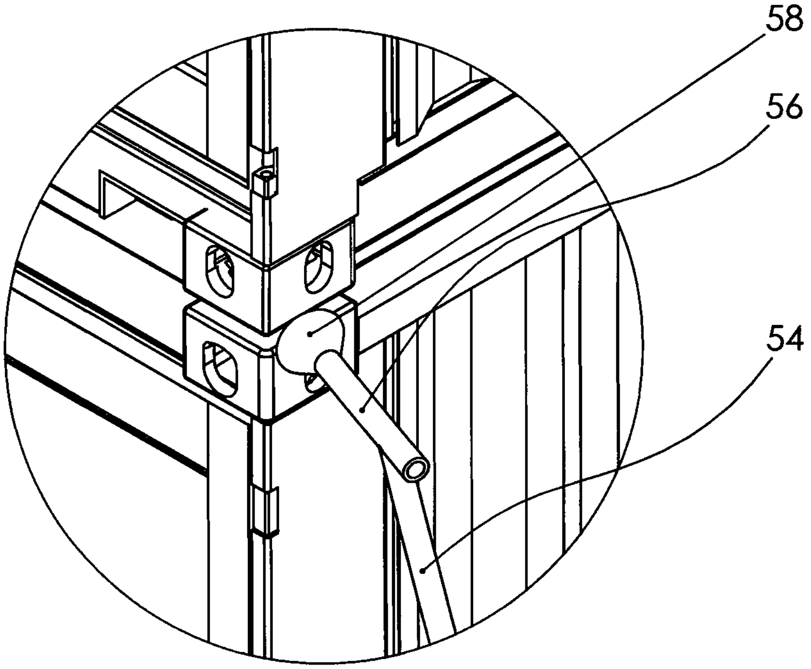
FIG. 8*b* is an enlarged detail showing the operating end of the locking pole engaged with the handle of the twistlock.

A second cargo container is then stacked on top of the lower cargo container. At this point, each of the four twistlocks located in the four corners must be locked. This may be accomplished by use of a locking pole 54 as shown in FIGS. 7*a* to 7*b*. Locking pole 54 preferably includes a receiving end 56 sized to engage handle 44. In one preferred embodiment, receiving end 56 includes a cone-shaped opening 58 to facilitate engagement with handle 44. The pole is rotated to the left to lock the twistlock. The unlocking of the twistlocks is performed in the opposite manner, as shown in FIGS. 8*a* to 8*b*. The pole is rotated to the right to unlock the twistlock. In one preferred embodiment, locking pole 54 is configured to be carried and stored on tool 10, as shown in FIG. 1.

Figure 9:
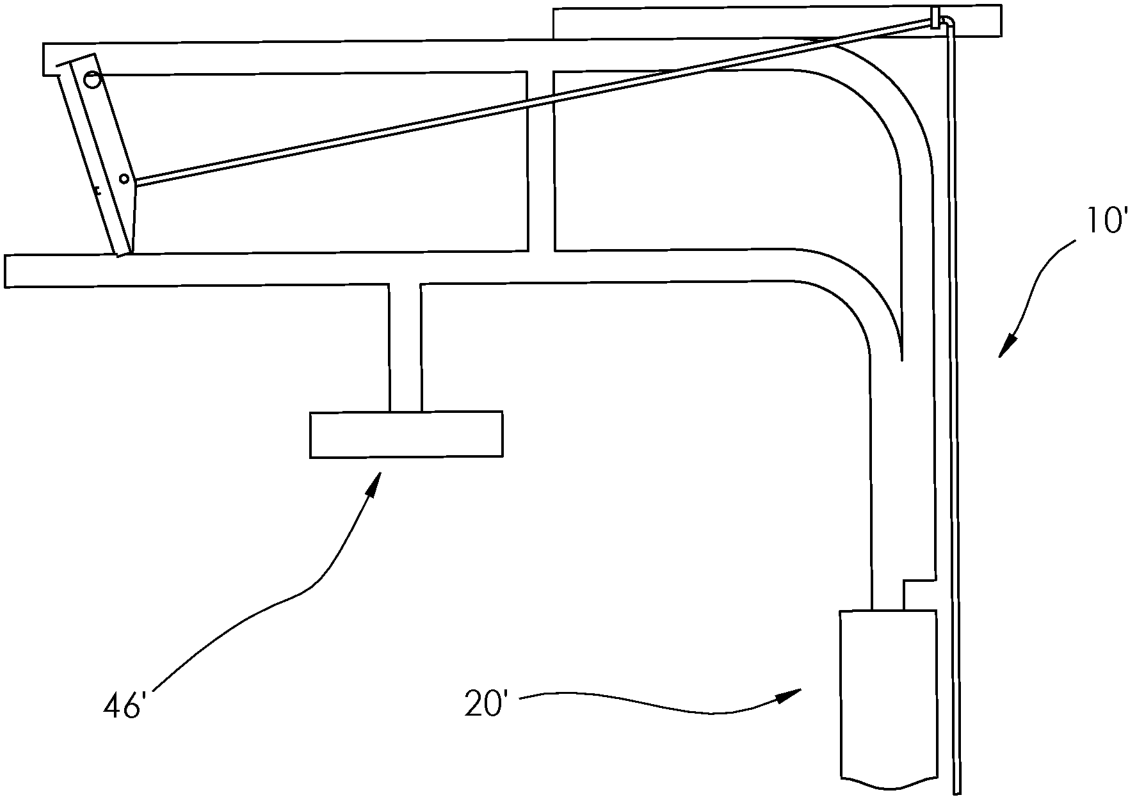
FIG. 9 is an elevation view of a second embodiment of the IBC installation/manipulation tool of the present invention.

In a second preferred embodiment shown in FIG. 9, tool 10' includes a telescoping column 20' which may be vertically raised and lowered. Tool 10' also includes a triangular-shaped channel 46' for orienting the twistlock with respect to the tool. Otherwise, tool 10' operates and functions in the same manner as tool 10.

To remove the twistlocks after the upper cargo container has been lifted, the operator repeats the foregoing steps in reverse. Locking pole 54 is used to unlock the twistlocks. The tool is wheeled towards the rail car. Guide 46 is oriented to engage handle 44, and the tool is then moved closer to the rail car causing lower horizontal bar 34 to slide within the opening of top cone 48. The boom/telescoping column of the tool is then raised—thereby lifting the twistlock out of opening 50 of ISO corner fitting 52. Tool 10 is then moved further away from the rail car so that the boom can be lowered, and the twistlock removed from the support structure.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A tool for installing and removing an interbox connector into and from a corner fitting of a cargo container positioned on a rail car, said connector including upper and lower locking cones, said upper locking cone including an opening therethrough, said connector further including a handle for twisting said cones, comprising:

a base;

a support column carried on said base;

a boom pivotably supported by said support column, said boom having a delivery end and an opposing operator end;

support structure attached to said delivery end of said boom, said support structure configured to releasably engage said opening in said upper locking cone whereby said connector can be delivered to or removed from said corner fitting of said cargo container, said support structure including an orienting mechanism for facilitating the orientation of said connector with respect to said corner fitting;

a release mechanism extending between said support structure and said operating end for releasing said connector from said support structure during installation; and wherein said boom is pivotable between a first position wherein said delivery end is located at a first height which allows an operator to load said connector onto said support structure and a second position wherein said delivery end is located at a second height which allows the operator to install or remove said connector to or from said corner fitting;

wherein said support structure includes a truss having an upper horizontal bar and a lower horizontal bar, and wherein said lower horizontal bar is sized and configured to extend through said opening in said upper locking cone whereby said connector is carried by said boom and delivered to or removed from said corner fitting of said cargo container;

wherein said support structure further includes a keeper, said keeper being secured to said upper horizontal bar and being positioned to retain said connector on said lower horizontal bar during transport of said connector to and from said corner fitting of said cargo container;

wherein said support structure further includes a guide, said guide being located and configured to engage said handle of said connector to orient said connector in a predetermined orientation; and wherein said guide is a tubular section secured to said lower horizontal bar of said truss, said tubular section being sized to allow said handle to slide therethrough.

2. The tool according to claim 1, wherein said release mechanism is a pull rope extending between said keeper and said operating end of said boom whereby said operator can actuate said keeper to allow said connector to disengage from said support structure.

3. The tool according to claim 2, wherein said keeper is movable between an open position and a closed position, and further comprising a spring for biasing said keeper to said closed position.

4. The tool according to claim 2, further comprising a plurality of pulleys to support and guide said pull rope between said keeper and said operating end of said boom.

5. The tool according to claim 2, further comprising a gripping mechanism attached to the end of said pull rope terminating at said operator end of said boom.

6. The tool according to claim 1, further comprising a counterweight attached to said operator end of said boom to facilitate the pivoting of said boom between said first and second positions.

7. A tool for installing and removing an interbox connector into and from a corner fitting of a cargo container positioned on a rail car, said connector including upper and lower locking cones, said upper locking cone including an opening therethrough, said connector further including a handle for twisting said cones, said handle movable along an arcuate pathway between an unlocked position and a locked position whereby said pathway defines a plane, comprising:

a base;

a support column carried on said base;

a boom pivotably supported by said support column, said boom having a delivery end and an opposing operator end;

support structure attached to said delivery end of said boom, said support structure configured to releasably engage said opening in said upper locking cone whereby said connector can be delivered to or removed from said corner fitting of said cargo container, said support structure including an orienting mechanism for facilitating the orientation of said connector with respect to said corner fitting;

a release mechanism extending between said support structure and said operating end for releasing said connector from said support structure during installation; and wherein said boom is pivotable between a first position wherein said delivery end is located at a first height which allows an operator to load said connector onto said support structure and a second position wherein said delivery end is located at a second height which allows the operator to install or remove said connector to or from said corner fitting;

wherein said support structure includes a truss having an upper horizontal bar and a lower horizontal bar, and wherein said lower horizontal bar is sized and configured to extend through said opening in said upper locking cone whereby said connector is carried by said boom and delivered to or removed from said corner fitting of said cargo container;

wherein said support structure further includes a keeper, said keeper being secured to said upper horizontal bar and being positioned to retain said connector on said lower horizontal bar during transport of said connector to and from said corner fitting of said cargo container; and wherein said orienting mechanism includes a guide, said guide being located and configured to engage said handle of said connector to orient said connector in a predetermined orientation by restricting movement of said handle within said plane.

8. The tool according to claim 7, wherein said release mechanism is a pull rope extending between said keeper and said operating end of said boom whereby said operator can actuate said keeper to allow said connector to disengage from said support structure.

9. The tool according to claim 8, wherein said keeper is movable between an open position and a closed position, and further comprising a spring for biasing said keeper to said closed position.

10. The tool according to claim 8, further comprising a gripping mechanism attached to the end of said pull rope terminating at said operator end of said boom.

11. The tool according to claim 7, wherein said guide is a tubular section secured to said lower horizontal bar of said truss, said tubular section being sized to allow said handle to slide therethrough.

* * * * *